United States Patent [19]

Svensson et al.

[11] 4,085,968
[45] Apr. 25, 1978

[54] BICYCLE CHAIR FOR CHILDREN

[75] Inventors: Sven Arne Svensson, Bastad; Bengt Ebbe Oscar Ebbeson, Halmstad, both of Sweden

[73] Assignee: Origoverken I Halmstad AB, Halmstad, Sweden

[21] Appl. No.: 702,290

[22] Filed: Jul. 2, 1976

[30] Foreign Application Priority Data

Jul. 7, 1975 Sweden ............................... 7507749

[51] Int. Cl.² ............................................. A47D 1/10
[52] U.S. Cl. .................................. 297/243; 297/352; 280/202; 224/30 R
[58] Field of Search ................. 297/352, DIG. 9, 243; 280/202; 224/30 R, 32 A, 32 R

[56] References Cited

U.S. PATENT DOCUMENTS

| 1,066,324 | 7/1913 | Robeson | 297/243 X |
| 1,164,207 | 12/1915 | Pawsat | 297/243 X |
| 3,396,885 | 8/1968 | Giondi | 224/32 R |
| 3,902,737 | 9/1975 | Berger et al. | 297/423 |
| 3,921,868 | 11/1975 | Reichbach | 224/32 A |

FOREIGN PATENT DOCUMENTS

| 495,706 | 5/1950 | Belgium | 224/30 R |
| 457,219 | 11/1936 | United Kingdom | 280/202 |

Primary Examiner—Francis K. Zugel
Attorney, Agent, or Firm—Irvin A. Lavine

[57] ABSTRACT

A bicycle chair for children has a mounting for fixing the chair on the bicycle, and a frame which is to abut against the luggage carrier of the bicycle and supports a rack, for a seat and the back support. The mounting is fixedly mounted on the bicycle in a position immediately ahead of the luggage carrier and the frame also forms a locking device for releasable locking of the frame on the mounting.

9 Claims, 5 Drawing Figures

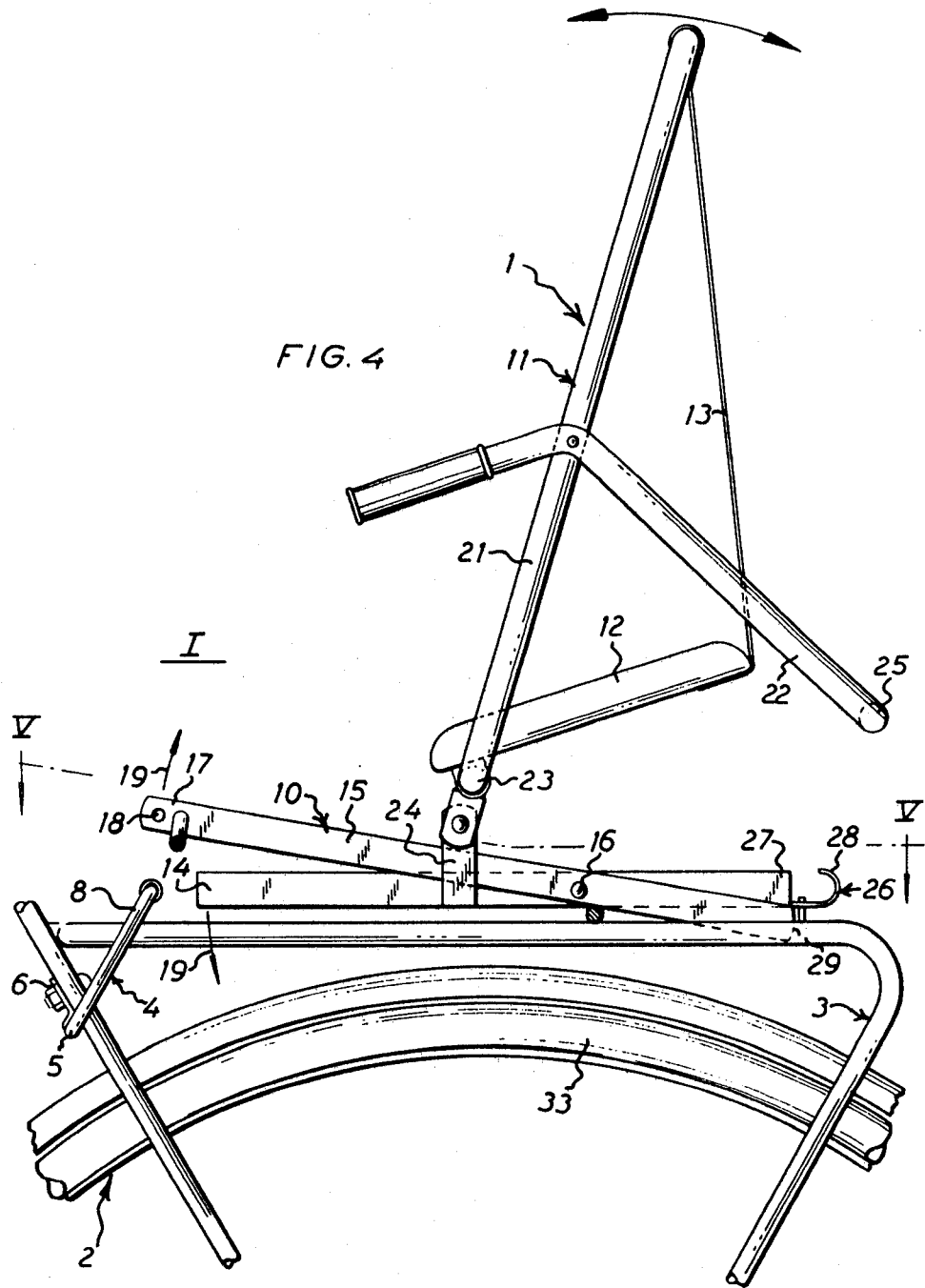

BICYCLE CHAIR FOR CHILDREN

The present invention relates to a bicycle chair for children, having a mounting for fixedly attaching the chair to the bicycle, and a frame which is to abut against the luggage carrier of the bicycle and which carries a rack for a seat and back support.

Conventional children's bicycle chairs of this type are, for the purposes of their mounting on the bicycle, adapted to a certain selected design of luggage carrier. In luggage carriers which are composed of longitudinal frame tubes and interconnecting rods, the children's chair has a mounting which engages under the frame tubes and/or any of the rods. In luggage carriers which are manufactured of pressed metal plate and are practically completely smooth, the mounting of the chair is fixedly clamped about the edge of the carrier. Thus, the purchaser of a children's chair is obliged to take into account the type of luggage carrier mounted on his bicycle.

The object of the present invention is to provide a children's chair of the type indicated by way of introduction which can be used together with almost any design of luggage carrier whatsoever, as long as the carrier has a practically flat carrier surface.

According to the invention, the mounting is fixedly lodged on the bicycle in a position immediately ahead of the luggage carrier and the frame also forms a locking device for releasable locking of the frame to the mounting.

The invention will be described in greater detail hereinbelow with reference to the accompanying drawings which show a preferred embodiment of the present invention, and in which:

FIG. 4 shows a projection corresponding to FIG. 2 and illustrates the method in which the chair is mounted on and released from the bicycle.

Figure 1:
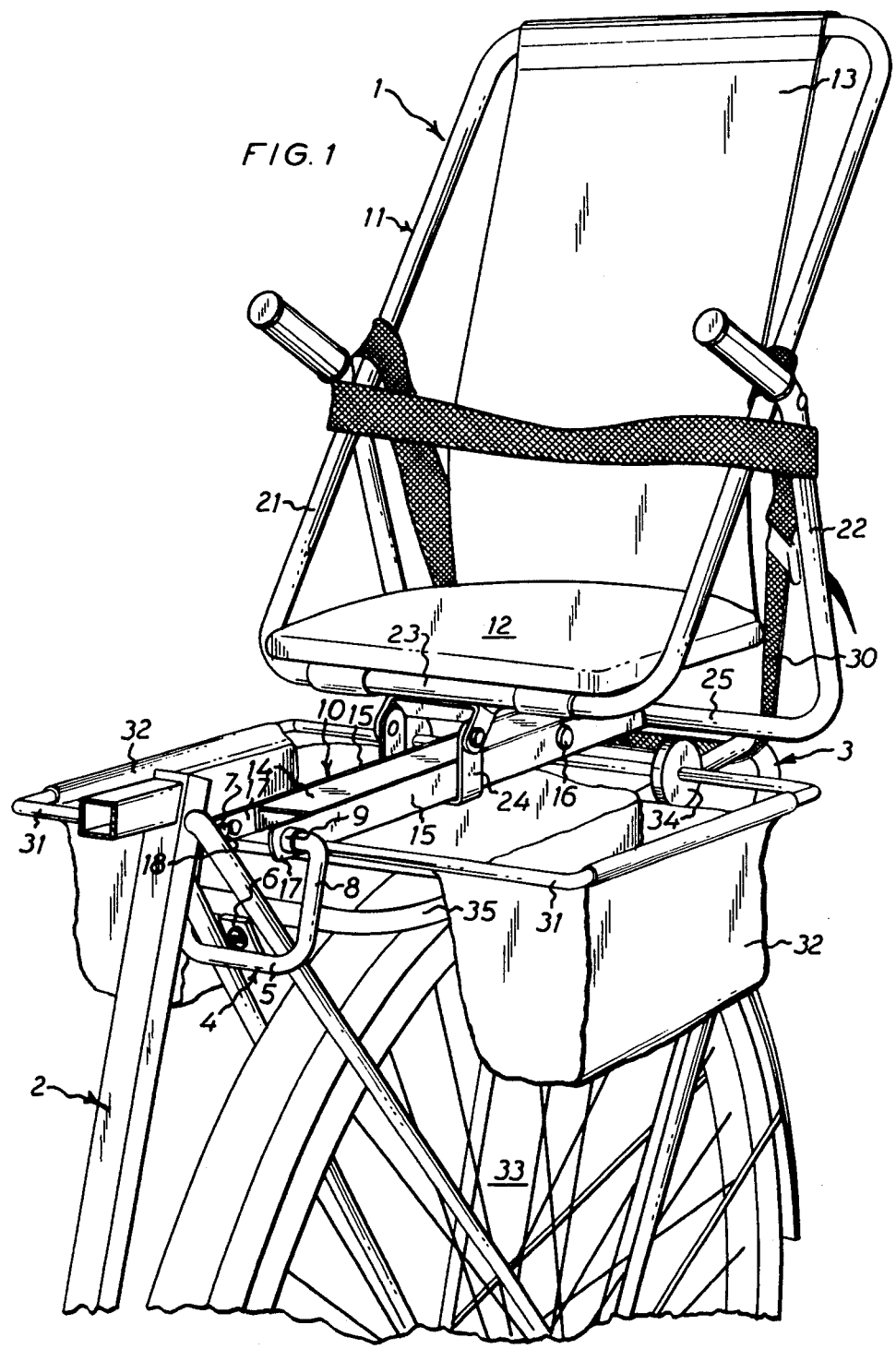
FIG. 1 shows the chair according to the present invention in perspective obliquely from above, the chair being mounted on a bicycle which is only partially shown.

The chair 1 shown on the drawings is intended to be fixedly mounted on a bicycle 2 in abutment against the luggage carrier 3 of the bicycle.

For the purpose of mounting the chair, there is provided a substantially U-shaped stirrup 4 of round iron or similar rigid material. A bracket 6 of plate metal is fixedly welded to the web 5 of the stirrup 4, the bracket having a through-hole for the passage of a fixing device in the form of a nut and bolt. The bracket 6, and thereby the stirrup 4, is fixedly mounted on the bicycle 2 by means of the fixing device, more precisely on the leading end of the mounting for the luggage carrier. The ends 7 of both shanks 8 of the stirrup 4 are bent in such a manner that they are directed towards each other, that is to say they are in register with each other. Stops 9 are, for reasons which will be described hereinbelow, mounted on these ends 7.

The chair 1 has a frame 10 which is to abut against the luggage carrier 3 and support a collapsible tubular rack 11 for the seat 12 and back support 13 of the chair. The frame 10 has a longitudinal, centrally located beam 14 which is of steel in box section. Two arms 15 of plate metal are pivotally connected to the beam 14 by means of an articulated link 16 and extend parallel to each other closely adjacent each longitudinal side of the beam 14. Thus, the distance between the arms 15 corresponds, with the exception of a small amount of play, to the width of the beam 14. The arms 15 project a distance ahead of the beam 14 and have, at their projecting ends 17, holes for the insertion of the registering ends 7 of the stirrup shanks 8, this insertion being described below.

Figure 2:
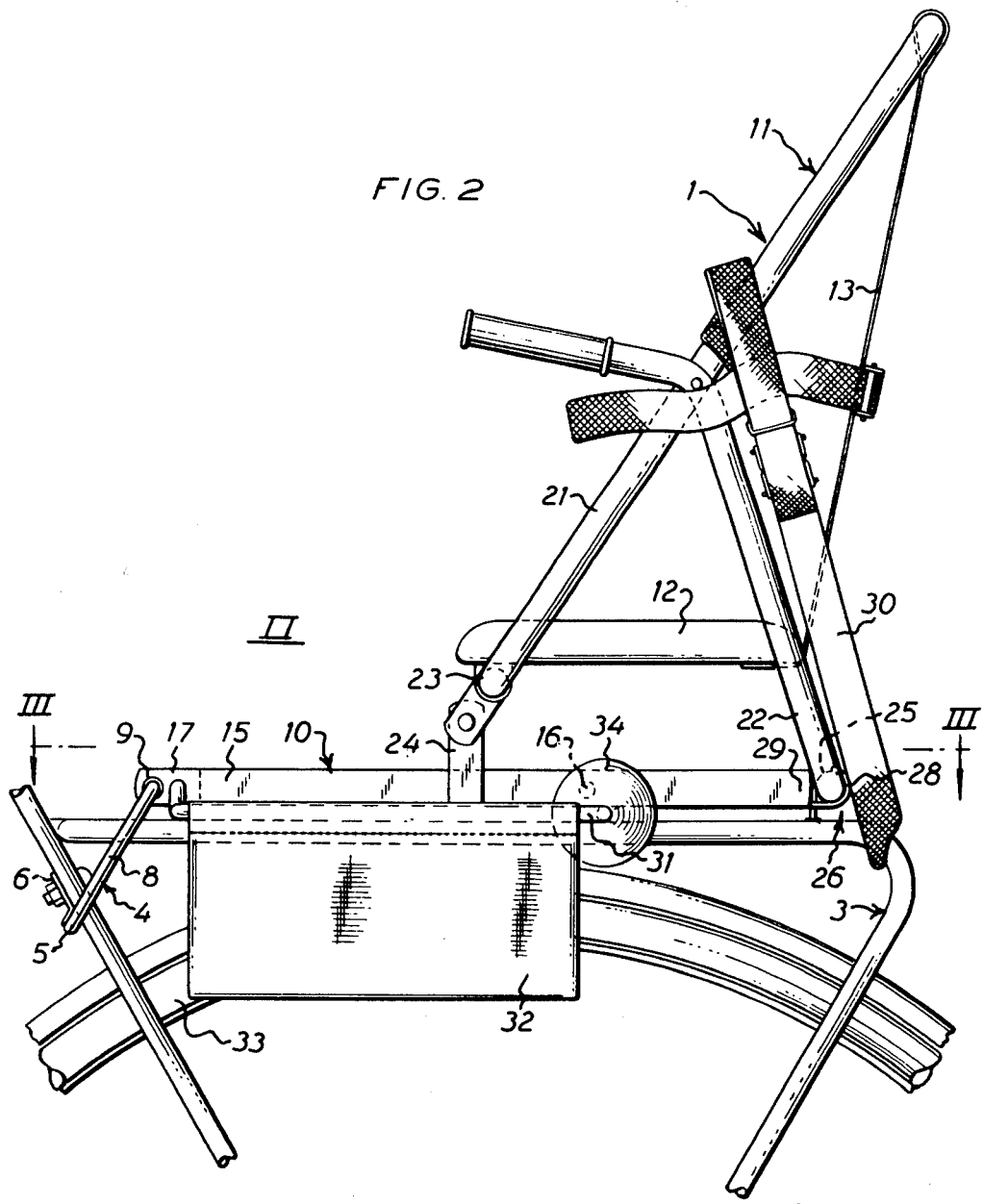
FIG. 2 shows the chair of FIG. 1 from the side.
Figure 3:
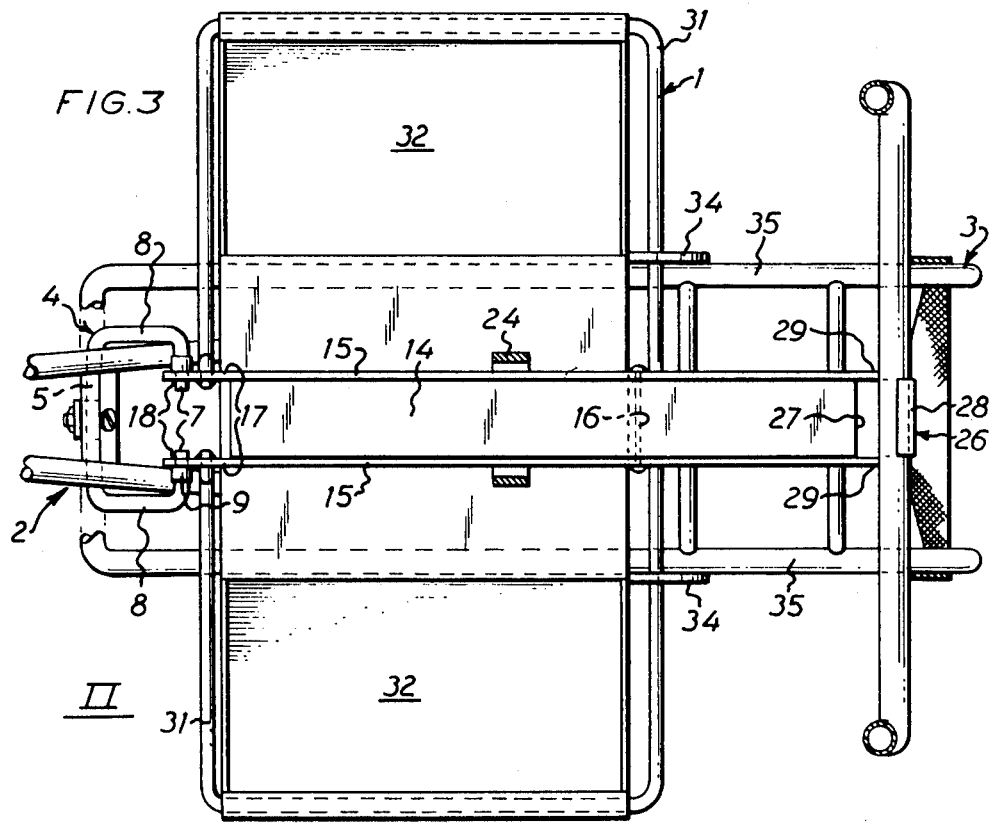
FIG. 3 shows a projection/section along the line III—III in FIG. 2.
Figure 5:
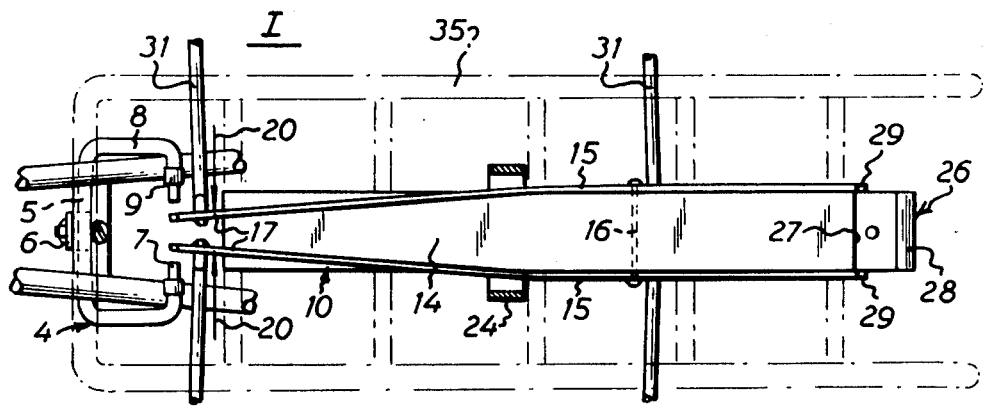
FIG. 5 shows a projection/section along the line V—V in FIG. 4.

Because the beam 14 and the arms 15 are pivotally connected to each other, they can, apart from forming the frame 10 of the chair 1, also form a locking device for releasable locking of the frame 10 on the stirrup 4. This locking will now be described with particular reference to FIG. 4 and 5. The beam 14 and the arms 15 are mutually pivoted in the direction of the arrow 19 to a first pivoting position I. In this position, the projecting ends 17 of the arms 15 can be pressed together, as is shown by means of the arrows 20 in FIG. 5, so that they can be inserted into the gap between the registering ends 7 of the stirrup shanks 8. When the arms 15 are subsequently released, with the holes 18 located opposite the ends 7, these ends penetrate in and through the holes. When this stange has been completed, the beam 14 and the arms 15 are pivoted back in a direction opposite that shown by the arrows 19 to a second pivoting position II according to FIG. 2, which pivoting position corresponds to the locking position. In this position, the projecting ends 17 of the arms 15 cannot be pressed together, since the arms are located facing the beam 14 throughout its entire length. On release of the frame 10, and thereby the entire chair 1, the procedure is carried out in the reverse sequence.

As was mentioned earlier, the tubular rack 11 for the seat 12 and back support 13 of the chair 1 is collapsible. In order to provide for this function, the rack 11 consists of two pivotally connected, bent tubes 21, 22, of which one, 21, is pivotally mounted, at the forward end 23 of the frame, to a bracket 24 fixedly mounted to the beam 14; and the other, 22, is releasably connected to a connection 26 at the rear end 25 of the frame, the connection 26 being formed of the ends 27, 29 of the beam 14 and the arms 15 located distally from the stirrup 4. The connection 26 is, more precisely, composed of a catch 28 fixedly welded to the rear end 27 of the beam 14 and bent with substantially the same radius as the radius of the tube 22. In the pivot position I between the beam 14 and the arms 15, the tube 22 can be freely inserted into and removed from the catch 28, please see FIG. 4, whereas the tube 22, in pivot position II, is fixedly clamped between the catch 28 and the rear ends 29 of the arms 15.

For the purposes of securely retaining the frame 10 in abutment against the luggage carrier 3, there is provided at the rear portion of the rack 11 a belt 30 which can be tightened around the luggage carrier 3.

For the purpose of protecting the feet of a child sitting in the chair 1, a protective rail 31 is fixed to the frame 10, more precisely on the arms 15 thereof. The protective rail is in rectangular form and made of round steel and provides an opening at either side of the frame. Moreover, this protective rail carries supports 32 for the feet of the child, the supports consisting of bags of flexible material, for example, nylon cloth or the like, with inlaid plates of hard material on the side facing the rear wheel 33 of the bicycle 2. As a result, the feet are also prevented from coming into contact with the spokes of the rear wheel 33.

For the purposes of fixing the chair 1 laterally on the luggage carrier 3, the protective rail 31 has fittings, for example in the form of rubber discs 34 which are slidably mounted on the rail 31 in order to be moved into abutment against the longitudinal sides 35 of the luggage carrier 3, independent of the width of the luggage carrier in each particular case.

The present invention should not be considered as restricted to that described above and shown on the drawings, many modifications being possible within the spirit and scope of the appended claims.

What we claim and desire to secure by Letter Patent is:

1. A bicycle chair for children, having a mounting for fixing the chair on the bicycle, said mounting comprising a substantially U-shaped stirrup having a web, a bracket secured to said web for connection to the bicycle, said stirrup having bent ends in register with each other, and having a frame which is to abut against the luggage carrier of the bicycle and supports a rack, for a seat and the back support, said frame comprising a longitudinal, centrally located beam and two arms placed adjacent each longitudinal side of the beam and pivotally connected thereto, the arms projecting ahead of the beam and having, at their projecting ends, holes for receiving the registering ends of the stirrup, wherein the mounting is adapted to be fixedly mounted on the bicycle in a position immediately ahead of the luggage carrier, and wherein the frame also forms a locking device for releasable locking of the frame on the mounting.

2. A children's chair as recited in claim 1, wherein the projecting ends of the arms, are, in a first pivoting position of the arms relative to the beam, moveable in a direction towards each other and insertable in the spacing between the registering ends of the stirrup, in order, after release, to be connectible to said ends via the holes in the projecting ends of the arms, and vice versa, and are in a second pivoting position, in which the beam and the arms are located opposite each other, prevented from being moveable in a direction towards each other and are, thereby, securely locked to the stirrup.

3. A children's chair as recited in claim 1, wherein the beam and the arms at their ends located distally from the stirrup, form a connection for releasable connection of the rear end of the rack which, at its leading end, is pivotally mounted on the beam.

4. A children's chair as recited in claim 3, wherein the rear end of the rack is securely connected to the connection when the beam and the arms are located in their second mutual pivoting position, and is released when the beam and the arms are located in their first mutual pivoting position, so that the rack is pivotal about its forward end for collapsing the chair.

5. A children's chair as recited in claim 1, wherein the rack and/or the frame has, at its rear portion, a device for locking this portion of the luggage carrier of the bicycle.

6. A children's chair as recited in claim 5, wherein said device consists of a belt or the like.

7. A children's chair as recited in claim 1, wherein a protective rail is connected to the frame for protecting the feet of a child sitting in the chair.

8. A children's chair as recited in claim 7, wherein the protecting rail carries supports for the feet of the child.

9. A children's chair as recited in claim 7, wherein the protecting rail has adjustable fittings which may be moved into abutment against the longitudinal sides of the luggage carrier for laterally fixing the chair.

* * * * *